United States Patent
Lewis et al.

(10) Patent No.: US 12,162,976 B2
(45) Date of Patent: *Dec. 10, 2024

(54) ISOPROPYLIDENEDIPHENOL-BASED POLYETHER POLYOLS, PROCESSES FOR THEIR PRODUCTION, AND FOAMS PRODUCED THEREFROM

(71) Applicant: Covestro LLC, Pittsburgh, PA (US)

(72) Inventors: Sharlene A. Lewis, Pittsburgh, PA (US); Anthony R. Loveday, Weirton, WV (US); Eric M. Rexrode, McDonald, PA (US)

(73) Assignee: Covestro LLC, Pittsburgh, PA (US)

( * ) Notice: Subject to any disclaimer, the term of this patent is extended or adjusted under 35 U.S.C. 154(b) by 419 days.

This patent is subject to a terminal disclaimer.

(21) Appl. No.: 17/670,707

(22) Filed: Feb. 14, 2022

(65) Prior Publication Data
US 2022/0267511 A1    Aug. 25, 2022

Related U.S. Application Data

(63) Continuation-in-part of application No. 17/185,042, filed on Feb. 25, 2021, now abandoned.

(51) Int. Cl.
*C08G 18/76* (2006.01)
*C08G 18/48* (2006.01)
*C08G 65/48* (2006.01)

(52) U.S. Cl.
CPC ..... *C08G 18/7671* (2013.01); *C08G 18/4833* (2013.01); *C08G 18/4879* (2013.01); *C08G 65/485* (2013.01); *C08G 2110/0025* (2021.01)

(58) Field of Classification Search
CPC .... C08G 18/022; C08G 18/18; C08G 18/225; C08G 18/4018; C08G 18/4208; C08G 18/4833; C08G 18/4845; C08G 18/4879; C08G 18/7664; C08G 18/7671; C08G 65/485; C08G 2110/0025; C08G 2110/005; C08K 5/0066; C08K 5/521
See application file for complete search history.

(56) References Cited

U.S. PATENT DOCUMENTS

| | | | |
|---|---|---|---|
| 4,757,096 A * | 7/1988 | Berthevas | C08G 18/6535 521/173 |
| 4,956,439 A * | 9/1990 | Tong | C08G 18/3221 528/80 |
| 10,253,134 B2 | 4/2019 | Nefzger et al. | |
| 2012/0004334 A1 * | 1/2012 | Kramer | C08G 18/4219 521/88 |
| 2014/0243560 A1 | 8/2014 | Lorenz et al. | |

FOREIGN PATENT DOCUMENTS

KR   20020065658 A   8/2002

OTHER PUBLICATIONS

Ionescu, M.; "Chemistry and Technology of Polyols for Polyurethanes"; 15.3—Bisphenol A Based Polyols; pp. 403-405; (2005); Rapra Technology Limited; Shawbury, Shrewsbury, Shropshire, SY4 4NR, United Kingdom.
Ionescu, M.; "Chemistry and Technology of Polyols for Polyurethanes"; Chapter 4—"Oligo-Polyols for Elastic Polyurethanes"; pp. 55-165; (2005); Rapra Technology Limited; Shawbury, Shrewsbury, Shropshire, SY4 4NR, United Kingdom.
Ionescu, M.; "Chemistry and Technology of Polyols for Polyurethanes"; Chapter 8—"Polyester Polyols for Elastic Polyurethanes"; pp. 263-294; (2005); Rapra Technology Limited; Shawbury, Shrewsbury, Shropshire, SY4 4NR, United Kingdom.
Ionescu, M.; "Chemistry and Technology of Polyols for Polyurethanes"; Chapter 13—"Polyether Polyols for Rigid Polyurethane Foams"; pp. 321-370; (2005); Rapra Technology Limited; Shawbury, Shrewsbury, Shropshire, SY4 4NR, United Kingdom.
Onescu, M.; "Chemistry and Technology of Polyols for Polyurethanes"; Chapter 16—"Polyester Polyols for Rigid Polyurethane Foams"; pp. 419-434; (2005); Rapra Technology Limited; Shawbury, Shrewsbury, Shropshire, SY4 4NR, United Kingdom.
Kulesza, Kamil et al; "Journal of Analytical and Applied Pyrolysis"; vol. 76; "Thermal decomposition of bisphenol A-based polyetherurethanes blown with pentane Part I—Thermal and pyrolytical studies"; No. 1-2; pp. 243-248; Jun. 1, 2006; Science Direct, Elsevier.
Lewis, Sharlene A. et al.: U.S. Appl. No. 17/185,091, filed Feb. 25, 2021; Title: Isopropylidenediphenol-Based Polyether Polyols, Processes for Their Production, and Foams Produced Therefrom.

* cited by examiner

*Primary Examiner* — John M Cooney
(74) *Attorney, Agent, or Firm* — Donald R. Palladino

(57) ABSTRACT

Isopropylidenediphenol-based polyether polyols, processes for their production, foams produced using such isopropylidenediphenol-based polyether polyols, such as PUR-PIR rigid foams, as well as to processes for producing such foams. The polyether polyols have an internal block comprising polymerized ethylene oxide moieties and an external cap comprising polymerized propylene oxide moieties.

18 Claims, No Drawings

ISOPROPYLIDENEDIPHENOL-BASED POLYETHER POLYOLS, PROCESSES FOR THEIR PRODUCTION, AND FOAMS PRODUCED THEREFROM

CROSS-REFERENCE TO RELATED APPLICATION

This application is a continuation-in-part application of, and claims the benefit of, U.S. patent application Ser. No. 17/185,042, filed Feb. 25, 2021, the entire contents of which being incorporated herein by reference.

FIELD

This specification relates to isopropylidenediphenol-based polyether polyols and to processes for their production. This specification also relates to foams produced using such isopropylidenediphenol-based polyether polyols, such as PUR-PIR rigid foams, as well as to processes for producing such foams.

BACKGROUND

Bisphenol A ("BPA") is used in a wide variety of applications. Raw BPA is processed by purifying the reaction product of acetone and phenol by distillation, wherein a so-called BPA resin occurs as a distillation residue. Depending on the intensity of the distillation, this BPA resin can have considerable proportions of 4,4'-isopropylidenediphenol. The remaining proportions are distributed among other structural elements derived from phenol, acetone and BPA, such as the 2,4'- and 2,2' isomers of the bisphenol base body.

For economic and sustainability reasons, it would be desirable to find a useful outlet for such a distillation residue, such as in the production of polyols for use in PUR-PIR rigid foam-producing formulations. The successful incorporation of BPA production residues in the production of PUR-PIR rigid foams would avoid them being disposed of, such as by incineration, thereby conserving the environment and contributing to the reduction in the use of inherently scarce raw materials, and ultimately of crude oil.

There are, however, challenges to successfully utilizing a BPA production residue in such a manner. In many cases, for example, PUR-PIR rigid foams are produced in the form of boards that are produced in a continuous manner, using a lamination process in which a foam-forming reaction mixture is deposited on a facing material as it travels along a conveyor system. The foam-forming reaction mixture is produced by combining an isocyanate-reactive composition, typically including one or more polyols, and a polyisocyanate at a mix head from which it flows onto the facing material. To produce high quality foam boards, it is important that the viscosity and reactivity of the reaction mixture are such that the reaction mixture is able to flow along the facing material prior to hardening. As the foam-forming reaction mixture reacts, it rises until the rise is restricted by a second facing material, which defines the thickness of the resulting foam laminate.

As a result, it would be desirable to provide isopropylidenediphenol-based polyether polyols suitable for use in PUR-PIR rigid foam formulations that can successfully be used in a continuous lamination process to produce PUR-PIR rigid foam composite elements that have good physical properties and which pass relevant flammability tests.

SUMMARY

In certain respects, this specification relates to polyether polyols. The polyether polyols comprise: (a) an alkoxylate of 4,4'-isopropylidenediphenol; (b) an alkoxylate of 2,4'-isopropylidenediphenol, 2,2'-isopropylidenediphenol, or a mixture thereof; and (c) an alkoxylate of components comprising structural elements which are derived from phenol, acetone, isopropylidenediphenol or a mixture of any two or more thereof, but which are not isomers of isopropylidenediphenol. In addition, the polyether polyol comprises an internal block comprising polymerized ethylene oxide moieties and an external cap comprising polymerized propylene oxide moieties, wherein polymerized propylene oxide moieties of the external cap are present in an amount of at least 20% by weight, based on the total weight of polymerized alkylene oxide moieties in the polyether polyol.

In other respects, this specification relates to processes for preparing a polyether polyol. These processes comprise: (a) polymerizing an active hydrogen-containing initiator and a first portion of alkylene oxide, in the presence of a catalyst, to form an intermediate polymer having at least one hydroxyl end-group; and (b) reacting the intermediate polymer and a second portion of alkylene oxide to form the polyether polyol. In these processes, the active hydrogen-containing initiator comprises: (i) 4,4'-isopropylidenediphenol, (ii) 2,4'-isopropylidenediphenol, 2,2'-isopropylidenediphenol, or a mixture thereof, and (iii) a component comprising structural elements which are derived from phenol, acetone, isopropylidenediphenol, or a mixture of any two or more thereof, but which are not isomers of isopropylidenediphenol. Moreover, in these processes, the first portion of alkylene oxide comprises ethylene oxide and the second portion of alkylene oxide comprises propylene oxide, in which the propylene oxide is present in the second portion of alkylene oxide in an amount of at least 20% by weight, based on the total weight of alkylene oxide used in the process.

In other respects, this specification relates to foam-forming reaction mixtures that include such polyether polyols, PUR-PIR rigid foams made from such foam-forming reaction mixtures, and processes for producing such PUR-PIR rigid foams.

DETAILED DESCRIPTION

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be prefaced and modified in all instances by the term "about", in which the numerical parameters possess the inherent variability characteristic of the underlying measurement techniques used to determine the numerical value of the parameter. At the very least, and not to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

As used herein, the term "functionality", when used with reference to a polyol, such as a polyether polyol, refers to the average number of reactive hydroxyl groups, —OH, present per molecule of the polyol or polyol blend that is being described. As used herein, the "arithmetically calculated functionality" of a polyol refers to the average functionality of a polyol based solely on the functionality of, and the relative amounts of, the starter compound(s) or initiator(s) used to prepare the polyether polyol.

As used herein, the term "measured OH number" or "measured hydroxyl number" refers to the number of reactive hydroxyl groups available for reaction, and is expressed as the number of milligrams of potassium hydroxide equivalent to the hydroxyl content of one gram of the polyol, and is determined according to ASTM D4274-16. The term "equivalent weight" refers to the weight of a compound divided by its valence. For a polyol, the equivalent weight is the weight of the polyol that will combine with an isocyanate group, and may be calculated by dividing the molecular weight of the polyol by its functionality. The equivalent weight of a polyol may also be calculated by dividing 56,100 by the hydroxyl number of the polyol–Equivalent Weight (g/eq)=(56.1×1000)/OH number.

The viscosity values of a polyol reported herein refer to a viscosity determined by ASTM-D4878-15. An Anton-Paar SVM 3000 viscometer at 25° C. was used. This instrument has been demonstrated to give equivalent results as can be generated with ASTM-D4878-15, in which the instrument is calibrated using mineral oil reference standards of known viscosity.

The number average and weight average (Mn and Mw) molecular weights reported herein can be determined by gel-permeation chromatography (GPC) using a method described in DIN 55672-1 of March 2016 with a mixed bed column (Agilent PL Gel; SDVB; 3 micron Pore diameter: 1×Mixed-E+5 micron Pore diameter: 2×Mixed-D), refractive index (RI) detection and calibrated with polyethylene glycol as the standard.

As used in this specification, "PUR-PIR rigid foam" refers to foams produced using an excess of isocyanate groups as compared to isocyanate-reactive groups, so in addition to urethane groups, isocyanurate structural elements are also formed due to isocyanate-trimerization reactions, as well as possibly urea groups from the reaction with water. Besides urethane groups, urea groups and isocyanurate structures, the PUR-PIR rigid foams may contain other groups, such those appearing by the reaction of the isocyanate group with other groups as well as with hydroxyl groups or other isocyanate groups. For example, the reaction of the isocyanate group with urea groups results, for example, in biuret structures, and the reaction of the isocyanate group with urethane groups results, for example, in allophanate structures. These structures are then present in the polymer together with the urethane-, urea- and isocyanurate groups.

As indicated, certain embodiments of the present specification are directed to polyether polyols. In some implementations, the polyether polyols have an arithmetically calculated functionality of, for example, at least 1.5, such as 1.5 to 3, 1.5 to 2.5, 1.8 to 2.5 or, in some cases, 1.8 to 2.2. In some embodiments, the polyether polyols have a viscosity at 25° C. (as determined by ASTM-D4878-15) of no more than 5000 mPas, such as 1000 to 5000 mPas, 3000 to 5000 mPas, 1000 to 4900 mPas or 3000 to 4900 mPas. In some embodiments, the polyether polyols have a measured hydroxyl number (as determined by ASTM D4274-16) of 100 to 400 mg KOH/g, 120 to 300 mg KOH/g, or, in some cases, 130 to 250 mg KOH/g, 150 to 200 mg KOH/g or 160 to 180 mg KOH/g.

The polyether polyols of this specification comprise: (a) an alkoxylate of 4,4'-isopropylidenediphenol; (b) an alkoxylate of 2,4'-isopropylidenediphenol, 2,2'-isopropylidenediphenol, or a mixture thereof, and (c) an alkoxylate of components comprising structural elements which are derived from phenol, acetone, isopropylidenediphenol or a mixture of any two or more thereof, but which are not isomers of isopropylidenediphenol.

The alkoxylation may be carried out by using known methods, such as by placing an H-functional starter composition comprising a BPA resin, the BPA resin comprising (i) 4'-isopropylidenediphenol; (ii) 2,4'-isopropylidenediphenol, 2,2'-isopropylidenediphenol, or a mixture thereof, and (iii) components comprising structural elements which are derived from phenol, acetone, isopropylidenediphenol or a mixture of any two or more thereof, but which are not isomers of isopropylidenediphenol, into a stirred autoclave together with a suitable catalyst and by metering alkylene oxide in at an elevated temperature.

More specifically, in some implementations, the BPA resin is a composition that occurs as a distillation residue during the production of BPA. In some implementations, the BPA resin comprises: (i) at least 10% by weight, such as 10 to 60% by weight, of 4,4'-isopropylidenediphenol; (ii) at least 5% by weight, such as 10 to 40% by weight of 2,4'- and/or 2,2'-isomers of the bisphenol base body; and (iii) at least 10% by weight, such as 10 to 60% by weight, of a compound with a chromane and/or indane base body, wherein each such weight percent is based on the total weight of the BPA resin. Exemplary such compounds with a chromane and/or indane base body are, without limitation, 4-(2,2,4-trimethyl-3,4-dihydro-2H-chromen-4-yl)phenol, which has the Structure (1), 4-(2,4,4-trimethyl-3-4-dihydro-2H-chromen-2-yl)phenol, which has the Structure (2), 3-(4-hydroxyphenyl)-1,1,3-trimethyl-2H-inden-5-ol, which has the Structure (3), and 1-(4-hydroxyphenyl)-1,3,3-trimethyl-2H-inden-5-ol, which has the Structure (4), in which:

Structure (1) is

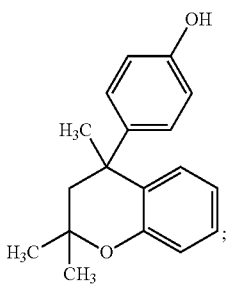

Structure (2) is

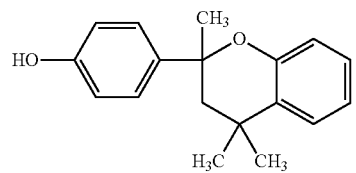

Structure (3) is

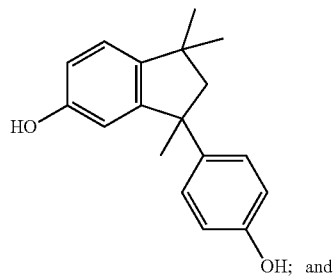

OH; and

Structure (4) is

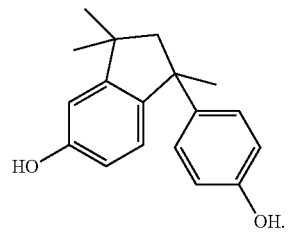

In addition to the BPA resin, other H-functional starter compounds may be employed. For example, in some implementations, the H-functional starter composition further comprises a diol having a molecular weight less than the molecular weight of isopropylidenediphenol and that does not contain structural elements derived from phenol, acetone and/or isopropylidenediphenol. Examples of such diols include, without limitation, ethylene glycol (molar mass of 62 g/mol), propylene glycol (molar mass of 76 g/mol), dipropylene glycol (molar mass of 134 g/mol), diethylene glycol (molar mass of 106 g/mol), 1,2-diphenyl-ethane-1,2-diol (molar mass of 214 g/mol), triethylene glycol (molar mass of 150 g/mol), butylene glycol (molar mass of 90 g/mol), cyclohexanediol (molar mass of 116 g/mol), cyclohexane-1,4-dimethanol (molar mass of 144 g/mol), pentanediol (molar mass of 104 g/mol), hexanediol (molar mass of 118 g/mol), neopentyl glycol (molar mass of 104 g/mol), as well as mixtures of any two or more thereof. In some implementations, such a diol is selected that has a molar mass of less than 150 g/mol, less than 100 g/mol, or, in some cases, less than 80 g/mol.

In some embodiments, the foregoing diol with a molecular weight less than the molecular weight of isopropylidenediphenol that does not contain structural elements derived from phenol, acetone, isopropylidenediphenol, or a mixture of any two or more thereof, is present in an amount of 0.1 to 20% by weight, 0.1 to 10% by weight, 1 to 5% by weight, or 1 to 3% by weight, based on the total weight of the H-functional starter composition employed.

To form the polyether polyol, the H-functional starter composition is reacted with an alkylene oxide. More specifically, in the polyether polyols of this specification, the alkoxylation reaction is conducted so as to result in a polyether polyol that comprises an internal block comprising polymerized ethylene oxide moieties and an external cap comprising polymerized propylene oxide moieties, wherein polymerized propylene oxide moieties of the external cap are present in an amount of at least 20% by weight, based on the total weight of polymerized alkylene oxide moieties in the polyether polyol.

To produce such a propylene oxide-capped polyether polyol, the H-functional starter composition may be reacted with a first portion of alkylene oxide, in the presence of a catalyst, to form an intermediate polymer having at least one hydroxyl end-group, and then the intermediate polymer reacted with a second portion of alkylene oxide to form the polyether polyol. In these implementations, the first portion of alkylene oxide comprises ethylene oxide and the second portion of alkylene oxide comprises propylene oxide.

The first portion of alkylene oxide may, if desired, include other alkylene oxides besides ethylene oxide, such as, without limitation, propylene oxide, 1,2-butylene oxide, or 2,3-butylene oxide, styrene oxide, or a mixture of any two or more thereof. Nevertheless, in some implementations, the first portion of alkylene oxide consists predominantly, or, in some cases, exclusively of ethylene oxide. Thus, in these implementations, ethylene oxide is present in the first portion of alkylene oxide in an amount of at least 50% by weight, at least 80% by weight, at least 90%, at least 95% by weight, or, in some cases, 100% by weight, based on the total weight of the first portion of alkylene oxide. Thus, in these implementations, the resulting polyether polyol comprises an internal block comprising polymerized ethylene oxide moieties, wherein the ethylene oxide moieties are present in an amount of least 50% by weight, at least 80% by weight, at least 90%, at least 95% by weight, or, in some cases, 100% by weight, based on the total weight of the polymerized alkylene oxide moieties of the internal block of the polyether polyol.

In addition, in some implementations, the second portion of alkylene oxide consists predominantly, or, in some cases, exclusively of propylene oxide. Thus, in these implementations, propylene oxide is present in the second portion of alkylene oxide in an amount of at least 50% by weight, at least 80% by weight, at least 90%, at least 95% by weight, or, in some cases, 100% by weight, based on the total weight of the second portion of alkylene oxide. Thus, in these implementations, the resulting polyether polyol comprises an external cap comprising polymerized propylene oxide moieties, wherein the propylene oxide moieties are present in an amount of least 50% by weight, at least 80% by weight, at least 90%, at least 95% by weight, or, in some cases, 100% by weight, based on the total weight of the polymerized alkylene oxide moieties of the external cap of the polyether polyol.

Nevertheless, in some implementations, ethylene oxide is present in an amount of at least 50% by weight or at least 60% by weight, based on the total amount of alkylene oxide used. In some of these implementations, the remainder of the alkylene oxide used may consist predominantly or exclusively of propylene oxide and, as a result, in some implementations, propylene oxide is present in an amount of up to 50% by weight, such as up to 40% by weight, based on the total weight of alkylene oxide that is used to produce the polyether polyol.

Furthermore, in polyether polyols of this specification, polymerized propylene oxide moieties of the external cap are present in an amount of at least 20% by weight, such as 20 to 50% by weight, 20 to 40% by weight, 30 to 40% by weight, or 35 to 40% by weight, based on the total weight of polymerized alkylene oxide moieties in the polyether polyol. Thus, in some of these embodiments, little or no propylene oxide moieties are present in the internal block.

In some implementations, the molar ratio of BPA resin to ethylene oxide-containing alkylene oxide mixture is chosen such that, per phenolic hydroxyl group, at least 1.5 mols of alkylene oxide are used.

It was discovered, surprisingly, that when isopropylidenediphenol-based polyether polyols of the type described herein were produced to include a propylene oxide external end-cap in which polymerized propylene oxide moieties of the external cap are present in amounts as described above, especially when also produced using an H-functional starter composition, as described above, that includes the diol having a molecular weight less than the molecular weight of isopropylidenediphenol, in the amounts described above, it was possible to provide an isopropylidenediphenol-based polyether polyol having a viscosity and reactivity profile such that they can be especially suitable for use in foam-formulations to be used in producing PUR-PIR rigid foams according to the lamination process described herein.

Suitable catalysts that may be used for the foregoing alkoxylation include tertiary amines with aliphatic, cycloaliphatic, aromatic and/or araliphatic residues bound to the nitrogen atom, and/or aromatic amines wherein the nitrogen atom may also be a part of a ring system and/or wherein the nitrogen atom may be part of an aromatic system. Also suitable are hydroxides or oxides of alkali and earth alkaline metals.

Specific examples of suitable catalysts include, for example, triethylenediamine, n,n-dimethylcyclohexylamine, 1-methyl-4-dimethylaminoethyl-piperazine, triethylamine, tributylamine, n,n-dimethylbenzylamine, dicyclohexylmethylamine, n,n',n''-tris-(dimethylamino-propyl)hexahydrotriazine, tris-(dimethylaminopropyl)amine, tris(dimethylaminomethyl)phenol, dimethylaminopropylformamide, n,n,n',n'-tetramethylethylenediamine, n,n,n',n'-tetramethylbutanediamine, n,n,n',n'-tetramethylhexanediamine, pentamethyl-diethylenetriamine, pentamethyldipropylenetriamine, tetramethyldiaminoethylether, n,n'-dimethylpiperazine, 1-azabicyclo[3.3.0]octane, bis-(dimethylaminopropyl)-urea, n-methylmorpholine, n-ethylmorpholine, n-cyclohexylmorpholine, 2,3-dimethyl-3,4,5,6-tetrahydropyrimidine, triethanolamine, triisopropanolamine, n-methyldiethanolamine, n-ethyldiethanolamine, n,n-dimethylaminoethanol and tris-(n n-di-methylaminopropyl)-s-hexahydrotriazine, 1,2-dimethylimidazole, n-methylimidazole, imidazole and/or n,n-dimethylamineopyridine. Suitable hydroxides of the alkali and earth alkaline metals are lithium-sodium-. potassium-, rubidium-, caesium-, magnesium-, calcium-, strontium- and barium hydroxides.

In some embodiments, sodium hydroxide and/or potassium hydroxide catalyst is used at a concentration of 50 to 5000 ppm, 1000 to 5000 ppm, or 4000 to 5000 ppm.

In some implementations, the BPA resin is used at an elevated temperature of, for example, 50 to 100° C., already with the employed catalyst, and atmospheric oxygen is replaced with nitrogen by repeated evacuation followed by ventilation. If desired, the alkoxylation reaction may takes place at an elevated temperature, such as 70 to 140° C. or 90 to 130° C. A solvent can be used in the process if desired. The temperature of the exothermic alkylene oxide addition reaction can be maintained at the desired level by cooling, if desired or necessary.

The addition of the alkylene oxide to the H-functional starter composition is usually conducted continuously over a period of, for example, 2 to 20 hours. However, as previously indicated, in implementations of the processes of this specification, the alkylene oxide is added in at least two portions as described above.

In these implementations, the process comprises a step in which ethylene oxide is either homopolymerized or copolymerized with the H-functional starter composition, often in the presence of a catalyst as described above. In some implementations of this step, ethylene oxide is present in an amount of at least 50% by weight, at least 80% by weight, at least 90%, at least 95% by weight, or 100% by weight, based on the total weight of alkylene oxide employed.

In some cases, the polymerization of the ethylene oxide is carried out at a temperature of 30° to 150° C., such as 100 to 120° C. The reaction pressure may be atmospheric, subatmospheric, or above atmospheric. The polymerization may be carried out in the inert solvent, if desired, such as an aromatic hydrocarbon. In some implementations, the H-functional starter composition is stirred and the alkylene oxide added in a continuous fashion to the mixture.

After polymerization of the first portion of alkylene oxide, to form the internal block, the intermediate polymer is reacted with the second proportion of alkylene oxide to yield an end-capped polyether polyol. In some implementations of this step, propylene oxide is present in an amount of at least 50% by weight, at least 80% by weight, at least 90%, at least 95% by weight, or, in some cases, 100% by weight, based on the total weight of alkylene oxide employed in the second portion of alkylene oxide to react with the intermediate polymer.

The reaction conditions employed during the end-capping step may be the same as or similar to those used to form the internal block. Removal of ethylene oxide remaining after formation of the internal block prior to the end-capping step may be conducted, if desired.

The amount of propylene oxide to be added to produce the end-cap will vary depending upon the molecular weight and functionality of the intermediate polymer. However, as mentioned earlier, in some implementations, polymerized propylene oxide moieties of the external cap are present in an amount of at least 20% by weight, such as 20 to 50% by weight, 20 to 40% by weight, or 30 to 40% by weight, or 35 to 40% by weight, based on the total weight of polymerized alkylene oxide moieties in the polyether polyol.

After the end-capping step, a secondary reaction may follow to complete the reaction. This generally happens in several, such as 5 to 30, hours. After the secondary reaction time expires, a vacuum step can take place to remove residues of epoxides from the reaction mixture that may not have reacted. This vacuum step can be carried out at, for example, an absolute pressure of 500 mbar to 10 mbar over a period of 0.1 to 5 hours. The removal of traces of unreacted epoxides or other odor-forming, volatile, organic compounds can also be aided by stripping after the secondary reaction phase and, if desired, also after the vacuum step. During stripping, volatile components are removed, such as residual alkylene oxides or secondary components from the BPA resin that could not be alkoxylated, by introducing inert gases and/or steam into the liquid phase while simultaneously applying a vacuum, such as by passing inert gas and/or steam through at an absolute pressure of 5 mbar to 500 mbar. Alternatively, the introduction of steam can also be produced by the direct introduction of water under the surface of the liquid, such as at a temperature of >100° C. and an absolute pressure of 5 mbar to 500 mbar. The quantity of water introduced, or, respectively, the quantity of steam introduced can be determined empirically, and is sometimes between 10 and 30% by weight of water or steam, based on the total weight of the polyether polyol to be purified. The removal of volatile components, either in the vacuum and/or by stripping, may take place at a temperature of, for example, 20° C. to 200° C. or 50° C. to 160° C., often while stirring. The stripping process can also be performed in so-called stripping columns in which an inert gas- or steam flow is passed in counterflow by the product flow, such columns often being columns with fittings or being packed columns. In these columns, the transportation of the volatile auxiliary components is accelerated in the gas phase by enlarging the contact surface between liquid and gas space. In some implementations, stripping is carried out with steam or water, if necessary accompanied by the introduction of inert gas(es). U.S. Patent App. Pub. No. 2014/0243560 A1 at [0017]-[0048], the cited portion of which being incorporated herein by reference, describes reaction conditions and apparatus suitable for carrying out the alkoxylation process described herein.

The polyether polyols produced by the process described herein can be used in a variety of applications. In some cases, however, they are useful for producing PUR-PIR rigid foams. In some cases, the PUR-PIR rigid foam has a bulk density, according to DIN EN ISO 3386-1-98 in the version of September 2010 of 15 kg/m$^3$ to 300 kg/m$^3$ and a compressive strength according to DIN EN 826 in the version of May 1996 of 0.1 MPa to 5 MPa.

Thus, additional aspects of this specification are directed to methods of producing a PUR-PIR rigid foam comprising: a) reacting a polyether polyol of the type described in this specification with b) a polyisocyanate, wherein the reaction occurs in the presence of components comprising c) a blowing agent and d) a catalyst.

Any aliphatic, cycloaliphatic or aromatic di- and/or polyisocyanates (collectively referred to herein as "polyisocyanates") can be used for the production of PUR-PIR rigid foams of this specification. More specifically, in some implementations, the polyisocyanate comprises toluylene diisocyanate (TDI), diphenylmethane diisocyanate (MDI), or, in some cases, a mixture of diphenylmethane diisocyanate and polyphenylene polymethylene polyisocyanates (polymeric MDI). The isocyanates can also be modified, such as by assembling uretdione-, carbamate-, isocyanurate-, carbodiimide-, allophanate-, urethane-groups, or a combination thereof.

In addition to the polyether polyols described herein, the foam-forming reaction mixture may include other compounds with at least two isocyanate-reactive groups, i.e., with at least two hydrogen atoms reactive with isocyanate groups. Examples of such compounds those are having two or more reactive groups selected from OH groups, SH groups, NH groups, NH$_2$ groups and CH acidic groups, such as β-diketo groups. In some implementations, a compounds with 2 to 8 OH groups is employed, such as other polyether polyols and/or polyester polyols. In some implementations, the hydroxyl value of such other polyether polyols and such polyester polyols is 25 to 850 mg KOH/g or 25 to 450 mg KOH/g. In some implementations, such other polyether polyols and such polyester polyols have a functionality of 2 to 8 and a hydroxyl value greater than 160 mg KOH/g, such as greater than 200 mg KOH/g.

In some implementations, the foam-forming reaction mixture may further comprise a chain-extending and/or cross-linking agent, such as di- or trifunctional amines and alcohols, such those with a molecular weight lower than 400 g/mol, such as 60 to 300 g/mol.

Suitable blowing agents include physical and chemical blowing agents. As used herein, the term "chemical blowing agent" refers to compounds that form gaseous products by reacting with isocyanate. On the other hand, "physical blowing agent", as used herein, refers to compounds which are used in a liquid or gaseous form and do not react chemically with the isocyanate, but which are dissolved or emulsified in the input substances used in the polyurethane production and vaporize under the normal reaction conditions.

Suitable physical blowing agents include, for example, hydrocarbons, such as cyclopentane, isopentane, n-pentane, butane and propane, halogenated hydrocarbons, and other compounds, such as perfluorised alkanes, like perfluorhexane, perfluorised alkenes, such as 1,1,1,2,3,4,5,5,5-nonafluoro-4-(trifluoromethyl)-2-pentene, 1,1,1,3,4,4,5,5,5-nonafluoro-2-(trifluoromethyl)-2-pentene or cis-1,1,1,4,4,4-hexafluoro-2-butene, chlorofluoro alkenes, such as trans-1-chloro-3,3,3-trifluoropropene, and ethers, esters, ketones and/or acetals. Suitable chemical blowing agents include water and/or carboxylic acids, which, in a reaction with isocyanates, release carbon dioxide while forming urea or amides.

In some implementations, blowing agent is present in an amount of 0.1 to 30% by weight, 0.5 to 20% by weight, or, in some cases, 0.7 to 15% by weight, based on the total weight of the foam-forming reaction mixture. In some such implementations, the blowing agent comprises a hydrocarbon, such as n-pentane and/or cyclopentane, and water.

Suitable catalysts include, without limitation, organic tin compounds, such as tin diacetate, tin dioctoate, dibutyltin dilaurate, and/or strongly basic amines, such as 2,2,2-diazabicyclooctane, triethylamine, triethylenediamine, pentamethyldiethylenetriamine, n,n dimethylcyclohexylamine or bis(n,n dimethylaminoethyl)ether, n,n dimethylbenzylamine and n-methylimidazole, and, to catalyze the PIR reaction, examples include potassium acetate, sodium acetate, sodium-n-[(2-hydroxy-5-nonylphenyl)methyl]-n-methyl-aminoacetate, 2,4,6-tris[(3-dimethylamino)propyl]hexahydrotriazine, potassium octoate and aliphatic quaternary ammonium salts, such as tetramethylammonium pivalate.

In some implementations, catalyst is present in an amount of 0.05 to 3% by weight or 0.06 to 2% by weight, based on the total weight of the foam-forming reaction mixture.

The foam-forming reaction mixture may include, if desired, any of a variety of other additives, such as flame retardants, fillers, cell regulators, foam stabilizers, surface-active compounds and/or stabilizers against oxidation-related, thermal or microbiological degradation or ageing, as the case may be. Substances are designated as foam stabilizers when they promote the formation of a regular cell structure during foam formation.

Suitable flame retardants include, for example, brominated ethers, brominated alcohols, such as dibrominopentylalcohol, tribrominopentylalcohol and PHT-4-Diol, as well as chlorinated phosphates such as tris-(2-chlorethyl)phosphate, tris-(2-chlorisopropyl)phosphate, tris(1,3-dichlorisopropyl)phosphate, tris-(2,3-dibrompropyl)phosphate and tetrakis-(2-chlorethyl)-ethylenediphosphate. Other than the halogen-substituted phosphates, inorganic flame retardants, such as red phosphorus, preparations containing red phosphorus, aluminum oxide hydrate, antimony trioxide, ammonium polyphosphate, calcium sulfate or cyanuric acid derivatives, such as melamine or mixtures of at least two flame retardants, such as ammonium polyphosphates and melamine as well as, if necessary, starch, can also be used. To provide further liquid, halogen-free retardants, diethylethylphosphonate, triethylphosphate, dimethyl propyl phosphonate, diphenyl cresyl phosphate and others can be used.

In some implementations, flame retardant is present in an amount of 0.3 to 25% by weight or 0.5 to 5% by weight, based on total weight of the foam-forming reaction mixture.

In some implementations, polyisocyanate is present in the foam-forming reaction mixture in an amount sufficient to provide an isocyanate index of >100, such as 110 to 600, 150 to 500, or 180 to 450. As will be understood by the skilled artisan, "isocyanate index" refers to the quotient of the quantity [mol] of isocyanate groups actually used and the quantity [mol] of isocyanate reactive groups actually used, multiplied by 100: Index=(mols of isocyanate groups/mols of isocyanate reactive groups)*100

The PUR-PIR rigid foams of this specification can be produced discontinuously or continuously. In some implementations, however, a continuous double belt method is employed to produce a composite elements containing a PUR-PIR rigid foam core and one or more surface layers adhered to a face of the core, wherein flexible and/or rigid materials can be used as surface layers. For example, in some implementations, the surface layer may comprise concrete, wood, particle board, aluminum, copper, steel, stainless steel, paper, mineral wool and plastic, as well as multilayer composites. Exemplary plastics are acrylonitrile butadiene styrene copolymers, polyethylene, polystyrene, polyvinyl chloride and polypropylene.

More specifically, in some implementations, the PUR-PIR rigid foam is produced by depositing a foam-forming reaction mixture onto a first facing material as it is being fed on a conveyer. The foam-forming reaction mixture reacts in the vertical space defined between the first facing material and a second facing material, thereby rising until the rise is restricted by the second facing material, which defines the thickness of the resulting composite element. In certain embodiments, the thickness is ¼ to 1 inch, such as ¼ to ⅞ inch, or, in some cases, ½ inch.

While the polyurethane foam-forming reaction mixture is conveyed, the vertical expansion of the composition is restricted while the horizontal expansion of the mixture is restricted in the direction the composition is being conveyed by the reacted foam ahead, and in the opposite direction by the continuous flow of new reacting foam-forming composition behind it. Accordingly, the expanding mixture can flow laterally, perpendicular to the direction of the conveyor path, where it can expand. In certain embodiments, the polyurethane foam-forming composition is conveyed at a speed of at least 50 feet/minute (15 meters/minute), such as at least 80 feet/minute (24 meters/minute), such as 50 to 200 feet/minute (15 to 61 meters/minute), or, in some cases 80 to 120 feet/minute (24 to 37 meters/minute).

The PUR-PIR rigid foams described herein often have a closed cell content greater than 90% or greater than 95%. In some implementations, the PUR-PIR rigid foams produced as described herein have a density from 25 $g/m^3$ to 300 $g/m^3$ or 28 $g/m^3$ to 50 $g/m^3$.

Various aspects of the subject matter described herein are set out in the following numbered clauses:

Clause 1. A polyether polyol comprising: (a) an alkoxylate of 4,4'-isopropylidenediphenol; (b) an alkoxylate of 2,4'-isopropylidenediphenol, 2,2'-isopropylidenediphenol or a mixture thereof, and (c) an alkoxylate of components comprising structural elements which are derived from phenol, acetone, isopropylidenediphenol or a mixture of any two or more thereof, but which are not isomers of isopropylidenediphenol, wherein the polyether polyol comprises an internal block comprising polymerized ethylene oxide moieties and an external cap comprising polymerized propylene oxide moieties, wherein polymerized propylene oxide moieties of the external cap are present in an amount of at least 20% by weight, based on the total weight of polymerized alkylene oxide moieties in the polyether polyol.

Clause 2. The polyether polyol of clause 1, wherein the polyether polyol has an arithmetically calculated functionality of at least 1.5, of 1.5 to 3, of 1.5 to 2.5, of 1.8 to 2.5 or of 1.8 to 2.2.

Clause 3. The polyether polyol of clause 1 or clause 2, wherein the polyether polyol has a viscosity at 25° C. of no more than 5000 mPas, of 1000 to 5000 mPas, of 3000 to 5000 mPas, of 1000 to 4900 mPas or of 3000 to 4900 mPas.

Clause 4. The polyether polyol of one of clause 1 to clause 3, wherein the polyether polyol has a measured hydroxyl number of 100 to 400 mg KOH/g, of 120 to 300 mg KOH/g, of 130 to 250 mg KOH/g, of 150 to 200 mg KOH/g or of 160 to 180 mg KOH/g.

Clause 5. The polyether polyol of one of clause 1 to clause 4, wherein the alkoxylate of 4,4'-isopropylidenediphenol is present in an amount of at least 10% by weight or 10 to 60% by weight, based on the total weight of the polyether polyol.

Clause 6. The polyether polyol of one of clause 1 to clause 5, wherein the alkoxylate of 2,4'-isopropylidenediphenol, 2,2'-isopropylidenediphenol or a mixture thereof, is present in an amount of at least 5% by weight or 10 to 40% by weight, based on the total weight of the polyether polyol.

Clause 7. The polyether polyol of one of clause 1 to clause 6, wherein the alkoxylate of components comprising structural elements which are derived from phenol, acetone, isopropylidenediphenol, or a mixture of any two or more thereof, but which are not isomers of isopropylidenediphenol, are present in an amount of at least 10% by weight or 10 to 60% by weight, based on the total weight of the polyether polyol.

Clause 8. The polyether polyol of one of clause 1 to clause 7, wherein the polyether polyol further comprises an alkoxylate of a diol that has a molecular weight less than the molecular weight of isopropylidenediphenol and that does not contain structural elements derived from phenol, acetone, isopropylidenediphenol, or a mixture of any two or more thereof, such as an alkoxylate of ethylene glycol, an alkoxylate of propylene glycol, an alkoxylate of dipropylene glycol, an alkoxylate of diethylene glycol, an alkoxylate of 1,2-diphenyl-ethane-1,2-diol, an alkoxylate of triethylene glycol, an alkoxylate of butylene glycol, an alkoxylate of cyclohexanediol, an alkoxylate of cyclohexane-1,4-dimethanol, an alkoxylate of pentanediol, an alkoxylate of hexanediol, an alkoxylate of neopentyl glycol, or a mixture thereof.

Clause 9. The polyether polyol of clause 8, wherein the diol that has a molecular weight less than the molecular weight of isopropylidenediphenol and does not contain structural elements derived from phenol, acetone, isopropylidenediphenol, or a mixture of any two or more thereof, has a molar mass of less than 150 g/mol, less than 100 g/mol, or less than 80 g/mol.

Clause 10. The polyether polyol of one of clause 1 to clause 9, wherein polymerized ethylene oxide moieties are present in an amount of least 50% by weight, at least 80% by weight, at least 90%, at least 95% by weight, or 100% by weight, based on the total weight of the polymerized alkylene oxide moieties of the internal block of the polyether polyol.

Clause 11. The polyether polyol of one of clause 1 to clause 10, wherein polymerized propylene oxide moieties are present in an amount of least 50% by weight, at least 80% by weight, at least 90%, at least 95% by weight, or 100% by weight, based on the total weight of the polymerized alkylene oxide moieties of the external cap of the polyether polyol.

Clause 12. The polyether polyol of one of clause 1 to clause 11, wherein polymerized ethylene oxide moieties are present in an amount of at least 50% by weight or at least 60% by weight, based on the total weight alkylene oxide moieties in the polyether polyol.

Clause 13. The polyether polyol of one of clause 1 to clause 12, wherein polymerized propylene oxide moieties are present in an amount of up to 50% by weight or up to 40% by weight, based on the total weight of alkylene oxide used to produce the polyether polyol.

Clause 14. The polyether polyol of one of clause 1 to clause 13, wherein polymerized propylene oxide moieties of the external cap are present in an amount of 20 to 50% by weight, 20 to 40% by weight, 30 to 40% by weight, or 35 to 40% by weight, based on the total weight of polymerized alkylene oxide moieties in the polyether polyol.

Clause 15. A PUR-PIR rigid foam-forming reaction mixture comprising: (a) a polyisocyanate; and (b) the polyether polyol of one of clause 1 to clause 14.

Clause 16. The PUR-PIR rigid foam-forming reaction mixture of clause 15, wherein the polyisocyanate comprises TDI, MDI, or a mixture of MDI and polymeric MDI.

Clause 17. The PUR-PIR rigid foam-forming reaction mixture of clause 15 or clause 16, wherein the foam-forming reaction mixture further comprises a polyester polyol and/or a polyether polyol different from the polyether polyol of one of clause 1 to clause 14, wherein such polyester polyol or polyether polyol has a functionality of 2 to 8 and a hydroxyl value greater than 160 mg KOH/g or greater than 200 mg KOH/g.

Clause 18. The PUR-PIR rigid foam-forming reaction mixture of one of clause 15 to clause 17, further comprising a chemical blowing agent and a physical blowing agent, such as where the physical blowing agents comprises a hydrocarbons, such as cyclopentane, isopentane and n-pentane, butane, propane, or a mixture of any two or more thereof, a halogenated hydrocarbons, a perfluorised alkanes, a perfluorised alkenes, chlorofluoro alkenes, such as trans-1-chloro-3,3,3-trifluoropropene, or a mixture of any two or more thereof, and the chemical blowing agent comprises water and/or a carboxylic acid.

Clause 19. The PUR-PIR rigid foam-forming reaction mixture of clause 18, wherein blowing agent is present in an amount of 0.1 to 30% by weight, 0.5 to 20% by weight, or 0.7 to 15% by weight, based on the total weight of the foam-forming reaction mixture.

Clause 20. A method of forming a PUR-PIR rigid foam comprising reacting a polyisocyanate with the polyether polyol of one of clause 1 to clause 14, wherein the polyisocyanate is present in an amount sufficient to provide an isocyanate index of >100, 110 to 600, 150 to 500, or 180 to 450, and wherein the reaction occurs in the presence of components comprising c) a blowing agent and d) a catalyst.

Clause 21. The method of clause 20, wherein the polyisocyanate comprises TDI, MDI, or a mixture of MDI and polymeric MDI.

Clause 22. The method of clause 20 or clause 21, wherein the blowing agent comprises a chemical blowing agent and a physical blowing agent, such as where the physical blowing agents comprises a hydrocarbons, such as cyclopentane, isopentane and n-pentane, butane, propane, or a mixture of any two or more thereof, a halogenated hydrocarbons, a perfluorised alkanes, a perfluorised alkenes, chlorofluoro alkenes, such as trans-1-chloro-3,3,3-trifluoropropene, or a mixture of any two or more thereof, and the chemical blowing agent comprises water and/or a carboxylic acid.

Clause 23. The method of one of clause 20 to clause 22, wherein the blowing agent is present in an amount of 0.1 to 30% by weight, 0.5 to 20% by weight, or 0.7 to 15% by weight, based on the total weight of the foam-forming reaction mixture.

Clause 24. A process for preparing a polyether polyol, comprising: (a) polymerizing an active hydrogen-containing initiator composition and a first portion of alkylene oxide, in the presence of a catalyst, to form an intermediate polymer having at least one hydroxyl end-group; and (b) reacting the intermediate polymer and a second portion of alkylene oxide to form the polyether polyol, wherein the active hydrogen-containing initiator composition comprises: (i) 4,4'-isopropylidenediphenol, (ii) 2,4'-isopropylidenediphenol, 2,2'-isopropylidenediphenol, or a mixture thereof, and (iii) a component comprising structural elements which are derived from phenol, acetone, isopropylidenediphenol, or a mixture of any two or more thereof, but which are not isomers of isopropylidenediphenol, and wherein the first portion of alkylene oxide comprises ethylene oxide and the second portion of alkylene oxide comprises propylene oxide, in which the propylene oxide is present in the second portion of alkylene oxide in an amount of at least 20% by weight, based on the total weight of alkylene oxide used in the process.

Clause 25. The process of clause 24, wherein the polyether polyol has an arithmetically calculated functionality of at least 1.5, of 1.5 to 3, of 1.5 to 2.5, of 1.8 to 2.5 or of 1.8 to 2.2.

Clause 26. The process of clause 24 or clause 25, wherein the polyether polyol has a viscosity at 25° C. of no more than 5000 mPas, of 1000 to 5000 mPas, of 3000 to 5000 mPas, of 1000 to 4900 mPas or of 3000 to 4900 mPas.

Clause 27. The process of one of clause 24 to clause 26, wherein the polyether polyol has a measured hydroxyl number of 100 to 400 mg KOH/g, of 120 to 300 mg KOH/g, of 130 to 250 mg KOH/g, of 150 to 200 mg KOH/g or of 160 to 180 mg KOH/g.

Clause 28. The process of one of clause 24 to clause 27, wherein the active hydrogen-containing initiator composition comprises at least 10% by weight or 10 to 60% by weight, of 4,4'-isopropylidenediphenol, based on the total weight of the active hydrogen-containing initiator composition.

Clause 29. The process of one of clause 24 to clause 28, wherein the active hydrogen-containing initiator composition comprises at least 5% by weight or 10 to 40% by weight of 2,4'-isopropylidenediphenol, 2,2'-isopropylidenediphenol, or a mixture thereof, based on the total weight of the active hydrogen-containing initiator composition.

Clause 30. The process of one of clause 24 to clause 29, wherein the active hydrogen-containing initiator composition comprises at least 10% by weight or 10 to 60% by weight, of a compound with a chromane and/or indane base body, based on the total weight of the active hydrogen-containing initiator composition, such as where the compound with a chromane and/or indane base body comprises 4-(2,2,4-trimethyl-3.4-dihydro-2H-chromen-4-yl)phenol, 4-(2,4,4-trimethyl-3-4-dihydro-2H-chromen-2-yl)phenol, 3-(4-hydroxyphenyl)-1,1,3-trimethyl-2H-inden-5-ol, 1-(4-hydroxyphenyl)-1,3,3-trimethyl-2H-inden-5-ol, or a mixture thereof.

Clause 31. The process of one of clause 24 to clause 30, wherein the active hydrogen-containing initiator composition further comprises a diol that has a molecular weight less than the molecular weight of isopropylidenediphenol and that does not contain structural elements derived from phenol, acetone, isopropylidenediphenol, or a mixture of any two or more thereof, such as ethylene glycol, propylene glycol, dipropylene glycol, diethylene glycol, 1,2-diphenyl-ethane-1,2-diol, triethylene glycol, butylene glycol, cyclohexanediol, cyclohexane-1,4-dimethanol, pentanediol, hexanediol, neopentyl glycol, or a mixture of any two or more thereof.

Clause 32. The process of clause 31, wherein the diol that has a molecular weight less than the molecular weight of isopropylidenediphenol and that does not contain structural elements derived from phenol, acetone, isopropylidenediphenol, or a mixture of any two or more thereof, has a molar mass of less than 150 g/mol, less than 100 g/mol or less than 80 g/mol.

Clause 33. The process of clause 31 or clause 32, wherein the diol that has a molecular weight less than the molecular weight of isopropylidenediphenol and that does not contain structural elements derived from phenol, acetone, isopropylidenediphenol, or a mixture of any two or more thereof, is present in an amount of 0.1 to 20% by weight, such as 0.1 to 10% by weight, 1 to 5% by weight, or 1 to 3% by weight, based on the total weight of the active hydrogen-containing initiator composition.

Clause 34. The process of one of clause 24 to clause 33, wherein ethylene oxide is present in the first portion of alkylene oxide in an amount of at least 50% by weight, at least 80% by weight, at least 90%, at least 95% by weight, or 100% by weight, based on the total weight of the first portion of alkylene oxide.

Clause 35. The process of one of clause 24 to clause 34, wherein propylene oxide is present in the second portion of alkylene oxide in an amount of at least 50% by weight, at least 80% by weight, at least 90%, at least 95% by weight, or 100% by weight, based on the total weight of the second portion of alkylene oxide.

Clause 36. The process of one of clause 24 to clause 35, wherein ethylene oxide is present in an amount of at least 50% by weight or at least 60% by weight, based on the total amount of alkylene oxide used in the process.

Clause 37. The process of one of clause 24 to clause 36, wherein propylene oxide is present in an amount of up to 50% by weight, such as up to 40% by weight, based on the total weight of alkylene oxide that is used in the process.

Clause 38. The process of one of clause 24 to clause 37, wherein propylene oxide is present in the second portion of alkylene oxide in an amount of 20 to 50% by weight, 20 to 40% by weight, or 30 to 40% by weight, or 35 to 40% by weight, based on the total weight of alkylene oxide used in the process.

Clause 39. The process of one of clause 24 to clause 38, wherein the catalyst comprises sodium hydroxide and/or potassium hydroxide present at a concentrations of 50 to 5000 ppm, 1000 to 5000 ppm, 3000 to 5000 ppm, or 4000 to 5000 ppm.

Clause 40. The process of one of clause 24 to clause 39, further comprising a vacuum step to remove residues of any epoxides from the reaction mixture, wherein the vacuum step is carried out at an absolute pressure of 500 mbar to 10 mbar over a period of 0.1 to 5 hours.

Clause 41. The process of one of clause 24 to clause 40, further comprising a stripping step to remove volatile components, wherein the stripping step comprises introducing an inert gas and/or steam into a liquid phase while simultaneously applying a vacuum.

The non-limiting and non-exhaustive examples that follow are intended to further describe various non-limiting and non-exhaustive implementations without restricting the scope of the implementations described in this specification.

EXAMPLES

Example 1—Comparative 284.5 g of molten BPA resin and 5.9 g of 45.4% aqueous potassium hydroxide solution was added to a 1 L reactor that was preheated to 110-120° C. The reactor was then sealed. While stirring, the reactor temperature was increased to 120° C. Oxygen was removed by filling the reactor with nitrogen to a pressure of 40 psia and then venting the reactor to reduce the pressure to atmospheric pressure. This was repeated three times. The reactor was then filled with nitrogen to a pressure of 20 psia. 416.1 g of ethylene oxide ("EO") was then introduced over 4.7 hours. The maximum pressure observed during EO dosing was 43 psia. After completion of the ethoxylation the reactor was held at temperature for a sufficient time to react the ethylene oxide. The reactor was cooled to 90° C. and 5.2 g of a 88% aqueous lactic acid solution was added. The temperature was increased to 120° C. and the polyol was stripped under vacuum for 1 hour. The reactor was cooled to 90° C. and 0.4 g of Irganox 1076 was added and the final polyol collected.

Example 2—Comparative 312.8 g of molten BPA resin and 6.2 g of 45.4% aqueous potassium hydroxide solution was added to a 1 L reactor that was preheated to 110-120° C. The reactor was then sealed. While stirring, the reactor temperature was increased to 120° C. Oxygen was removed by filling the reactor with nitrogen to a pressure of 40 psia and then venting the reactor to reduce the pressure to atmospheric pressure. This was repeated three times. The reactor was then filled with nitrogen to a pressure of 20 psia. 384.0 g of ethylene oxide ("EO") was then introduced over 4.25 hours. The maximum pressure observed during EO dosing was 43 psia. After completion of the ethoxylation the reactor was held at temperature for a sufficient time to react the ethylene oxide. The reactor was cooled to 90° C. and 5.3 g of a 88% aqueous lactic acid solution was added. The temperature was increased to 120° C. and the polyol was stripped under vacuum for 1 hour. The reactor was cooled to 90° C. and 0.4 g of Irganox 1076 were added and the final polyol collected.

Example 3—Comparative 228.7 g of molten BPA resin and 6.2 g of 45.4% aqueous potassium hydroxide solution was added to a 1 L reactor that was preheated to 110-120° C. The reactor was then sealed. While stirring, the reactor temperature was increased to 120° C. Oxygen was removed by filling the reactor with nitrogen to a pressure of 40 psia and then venting the reactor to reduce the pressure to atmospheric pressure. This was repeated three times. 278.1 g of propylene oxide ("PO") was then introduced over 3.7 hours. The maximum pressure observed during PO dosing was 53 psia. After completion of the propoxylation the reactor was held at temperature for a sufficient time to react the propylene oxide. The reactor was cooled to 90° C. and 5.4 g of a 88% aqueous lactic acid solution was added. The temperature was increased to 120° C. and the polyol was stripped under vacuum for 0.75 hours. The reactor was cooled to 90° C. and 0.3 g of Irganox 1076 were added and the final polyol collected.

Example 4—Comparative 345.0 g of molten BPA resin and 6.2 g of 45.4% aqueous potassium hydroxide solution was added to a 1 L reactor that was preheated to 110-120° C. The reactor was then sealed. While stirring, the reactor temperature was increased to 120° C. Oxygen was removed by filling the reactor with nitrogen to a pressure of 40 psia and then venting the reactor to reduce the pressure to atmospheric pressure. This was repeated three times. 419.3 g of propylene oxide ("PO") was then introduced over 5.5 hours. The maximum pressure observed during PO dosing was 60 psia. After completion of the propoxylation the reactor was held at temperature for a sufficient time to react the propylene oxide. The reactor was cooled to 90° C. and 5.4 g of a 88% aqueous lactic acid solution was added. The temperature was increased to 120° C. and the polyol was stripped under vacuum for 0.75 hours.

The reactor was cooled to 90° C. and 0.4 g of Irganox 1076 were added and the final polyol collected.

Example 5—Inventive 4385.1 g of molten BPA resin and 74.3 g of 45.4% aqueous potassium hydroxide solution was added to a 8 gallon reactor that was preheated to 100-105° C. The reactor was then sealed. While stirring, the reactor temperature was increased to 120° C. Oxygen was removed by filling the reactor with nitrogen to a pressure of 40 psia and then venting the reactor to reduce the pressure to atmospheric pressure. This was repeated twice. The reactor was then filled with nitrogen to a pressure of 20 psia. 3227.0 g of ethylene oxide ("EO") was then introduced over 2.25 hours. The maximum pressure observed during EO dosing was 43 psia. After completion of the ethoxylation the reactor was held at temperature for a sufficient time to react the ethylene oxide. Next, 1857.8 g of propylene oxide ("PO") was introduced over 2.5 hours. The maximum pressure observed during PO dosing was 43 psia. After completion of the propoxylation, the reactor was held at temperature for a sufficient time to react the propylene oxide. Next, the reactor was cooled to 80° C. and 285.0 g of a 20% aqueous lactic acid solution was added. The temperature was increased to 120° C. and the polyol was stripped under vacuum with a nitrogen sparge for 3 hours. The reactor was cooled to 90° C. and 4.8 g of Irganox 1076 were added and the final polyol collected.

Example 6—Inventive 4697.8 g of molten BPA resin, 270.2 g of propylene glycol and 93.5 g of 45.4% aqueous potassium hydroxide solution was added to a 8 gallon reactor that was preheated to 100-105° C. The reactor was then sealed. While stirring, the reactor temperature was increased to 120° C. Oxygen was removed by filling the reactor with nitrogen to a pressure of 40 psia and then venting the reactor to reduce the pressure to atmospheric pressure. This was repeated once. The reactor was then filled with nitrogen to a pressure of 20 psia. 4650.5 g of ethylene oxide ("EO") was then introduced over 2.25 hours. The maximum pressure observed during EO dosing was 38 psia. After completion of the ethoxylation the reactor was held at temperature for a sufficient time to react the ethylene oxide. Next, 2318.9 g of propylene oxide ("PO") was introduced over 1.5 hours. The maximum pressure observed during PO dosing was 45 psia. After completion of the propoxylation, the reactor was held at temperature for a sufficient time to react the propylene oxide. Next, the reactor was cooled to 80° C. and 713 g of a 11% aqueous lactic acid solution was added. The temperature was increased to 120° C. and the polyol was stripped under vacuum with a nitrogen sparge for 6 hours. The reactor was cooled to 90° C. and 6 g of Irganox 1076 were added and the final polyol collected.

Example 7—Inventive 1848.9 g of molten BPA resin, 304.1 g of propylene glycol and 37.1 g of 45.4% aqueous potassium hydroxide solution was added to a 8 gallon reactor that was preheated to 100-105° C. The reactor was then sealed. While stirring, the reactor temperature was increased to 120° C. Oxygen was removed by filling the reactor with nitrogen to a pressure of 40 psia and then venting the reactor to reduce the pressure to atmospheric pressure. This was repeated once. The reactor was then filled with nitrogen to a pressure of 20 psia. 1697.8 g of ethylene oxide ("EO") was then introduced over 0.9 hours. The maximum pressure observed during EO dosing was 48 psia. After completion of the ethoxylation the reactor was held at temperature for a sufficient time to react the ethylene oxide. Next, 845.9 g of propylene oxide was introduced over 0.6 hours. The maximum pressure observed during PO dosing was 52 psia. After completion of the propoxylation the reactor was held at temperature for a sufficient time to react the propylene oxide. Next, the reactor was cooled to 80° C. and 738.0 g of a 3.9% aqueous lactic acid solution was added. The temperature was increased to 120° C. and the polyol was stripped under vacuum with a nitrogen sparge for 24 hours. The reactor was cooled to 90° C. and 2.4 g of Irganox 1076 were added and the final polyol collected.

Example 8—Inventive 1665.2 g of molten BPA resin, 186.6 g of propylene glycol and 29.0 g of 45.4% aqueous potassium hydroxide solution was added to a 8 gallon reactor that was preheated to 100-105° C. The reactor was then sealed. While stirring, the reactor temperature was increased to 120° C. Oxygen was removed by filling the reactor with nitrogen to a pressure of 40 psia and then venting the reactor to reduce the pressure to atmospheric pressure. This was repeated once. The reactor was then filled with nitrogen to a pressure of 20 psia. 1237.0 g of ethylene oxide ("EO") was then introduced over 0.6 hours. The maximum pressure observed during EO dosing was 60 psia. After completion of the ethoxylation the reactor was held at temperature for a sufficient time to react the ethylene oxide. Next, 619.5 g of propylene oxide ("PO") was introduced over 0.5 hours. The maximum pressure observed during PO dosing was 57 psia. After completion of the propoxylation, the reactor was held at temperature for a sufficient time to react the propylene oxide. Next, the reactor was cooled to 80° C. and 581.3 g of a 3.8% aqueous lactic acid solution was added. The temperature was increased to 120° C. and the polyol was stripped under vacuum with a nitrogen sparge for 24 hours. The reactor was cooled to 90° C. and 1.9 g of Irganox 1076 were added and the final polyol collected.

Table 1 summarizes the composition and properties of polyether polyols of Examples 1-8.

Examples 9-22

Foam-forming compositions were prepared using the ingredients and amounts (in parts by weight) set forth in Tables 2 and 3 below. The following materials were used: POLYOL 1: Stepanpol® PS-2352 polyester polyol having a functionality of 2, an OH number of 235 mg KOH/g and a viscosity at 25° C. of 3,000 cps, which is commercially available from the Stepan Company; POLYOL 2: A polyol produced by mixing the polyol produced in Example 1 with the polyol produced in Example 2; POLYOL 3: A polyol produced by mixing the polyol produced in Example 3 with the polyol produced in Example 4; POLYOL 4: The polyol produced in Example 5; POLYOL 5: The polyol produced in Example 6; POLYOL 6: The polyol produced in Example 8; POLYOL 7: The polyol produced in Example 7; CAT 2: Potassium octoate which is commercially available under the name Dabco® K-15 from Air Products Company; CAT 1: Potassium acetate available under the name Polycat® 46 from Air Products Company; CAT 3: Tertiary amine-based catalyst available under the name Polycat® 36 from Evonik Industries; SURF 2: Surfactant available under the name Tegostab® B 8513 from Evonik Industries; SURF 1: Surfactant available under the name Tegostab® B 8871 from Evonik Industries; FR: Halogenated flame retardant which is commercially available under the name Fyrol® PCF from ICL-Supresta; CAT 4: Potassium 2-ethylhexanoate which is commercially available under the name PEL-CAT 9540-A from Elé Corporation; CAT 5: Solution of potassium acetate in diethylene glycol which is commercially available under the name PEL-CAT 9650 from Elé Corporation; CAT 6: Tertiary amine-based catalyst available under the name Polycat® 36 from Evonik Industries; ISO: Polymeric MDI which is commercially available under the name Mondur® 489 from Covestro LLC.

To prepare the foams, all B-side components (i.e., components included in the isocyanate-reactive component) with the exception of the blowing agent were blended with a mechanical flat blade turbine mixer. Blowing agent was added to the B-side resin blend and mixed briefly before the

TABLE 1

|  | Example 1 | Example 2 | Example 3 | Example 4 | Example 5 | Example 6 | Example 7 | Example 8 |
|---|---|---|---|---|---|---|---|---|
| BPA-resin (g) | 284.5 | 312.8 | 228.7 | 345.0 | 4385.1 | 4697.8 | 1848.9 | 1665.2 |
| PG (g) | 0 | 0 | 0 | 0 | 0 | 270.2 | 304.1 | 186.6 |
| 45.4% KOH catalyst solution (g) | 5.9 | 6.2 | 6.2 | 6.2 | 74.3 | 93.5 | 37.1 | 29.0 |
| Catalyst concentration (%) | 0.38 | 0.40 | 0.55 | 0.36 | 0.35 | 0.35 | 0.35 | 0.35 |
| EO (g) | 416.1 | 384.0 | 0 | 0 | 3227.0 | 4650.5 | 1697.8 | 1237.0 |
| PO (g) | 0 | 0 | 278.1 | 419.3 | 1857.8 | 2318.9 | 845.9 | 619.5 |
| Lactic acid solution (g) | 5.2 | 5.3 | 5.4 | 5.4 | 285.0 | 713.0 | 738.0 | 581.3 |
| Lactic acid Concentration | 88% | 88% | 88% | 88% | 20% | 11% | 3.9% | 3.8% |
| mole ratio lactic acid:KOH | 1.05 | 1.09 | 1.07 | 1.06 | 1.05 | 1.15 | 1.05 | 1.05 |
| Irganox 1076 (g) | 0.4 | 0.4 | 0.3 | 0.4 | 4.8 | 6.0 | 2.4 | 1.9 |
| % BPA-resin | 40.2 | 44.4 | 44.4 | 44.7 | 45.8 | 38.9 | 39.0 | 44.5 |
| % PG | 0 | 0 | 0 | 0 | 0.0 | 2.2 | 6.4 | 5.0 |
| Hydroxyl number (mg KOH/g) | 170 | 184 | 195 | 181 | 166 | 176 | 238 | 242 |
| Viscosity (mPas), 25° C. | 2524 | 3703 | 7634 | 9719 | 4885 | 2058 | 1619 | 3451 | isocyanate was added and the resultant mixture was mixed at high speed for about 5 seconds. The mixture was then poured into a 12" (30.5 cm)×12" (30.5 cm)×2.5" (6.4 cm) cardboard box and the foam was allowed to rise freely. The rising foam surface was gently probed with a wooden stick to determine string gel and tack free time.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

TABLE 2

| Chemical | Example Number | | | | | | | | |
|---|---|---|---|---|---|---|---|---|---|
| | 9 | 10 | 11 | 12 | 13 | 14 | 15 | 16 | 17 |
| POLYOL 1 | 100.00 | — | 100.00 | — | 100.00 | — | 100.00 | — | — |
| POLYOL 2 | — | 30.00 | — | — | — | — | — | — | — |
| POLYOL 3 | — | 70.00 | — | — | — | — | — | — | — |
| POLYOL 4 | — | — | — | 100.00 | — | — | — | — | — |
| POLYOL 5 | — | — | — | — | — | 100.00 | — | — | — |
| POLYOL 6 | — | — | — | — | — | — | — | 100.00 | — |
| POLYOL 7 | — | — | — | — | — | — | — | — | 100.00 |
| FR | 12.50 | 12.27 | 12.50 | 12.87 | 12.50 | 12.67 | 12.50 | 12.50 | 12.50 |
| SURF 1 | 2.50 | 2.50 | 2.50 | 2.50 | 2.50 | 2.50 | 2.50 | 2.50 | 2.50 |
| WATER | 0.32 | 0.32 | 0.32 | 0.32 | 0.32 | 0.32 | 0.32 | 0.32 | 0.32 |
| CAT 1 | 0.77 | 0.47 | 0.77 | 0.81 | 0.77 | 0.78 | 0.77 | 0.77 | 0.77 |
| CAT 2 | 6.15 | 3.76 | 6.15 | 6.44 | 6.15 | 6.17 | 6.15 | 6.15 | 6.15 |
| CAT 3 | 0.28 | 0.17 | 0.27 | 0.28 | 0.27 | 0.26 | 0.27 | 0.27 | 0.27 |
| ISOPENTANE | 11.75 | 11.20 | 11.75 | 13.63 | 11.75 | 12.50 | 11.75 | 12.40 | 11.50 |
| N-PENTANE | 11.75 | 11.20 | 11.75 | 13.63 | 11.75 | 12.50 | 11.75 | 12.40 | 11.50 |
| ISO | 185.05 | 151.86 | 185.05 | 190.52 | 185.05 | 187.27 | 185.05 | 184.93 | 185.01 |
| Properties | | | | | | | | | |
| Index | 249.8 | 269.3 | 249.8 | 337.1 | 249.8 | 320.0 | 249.8 | 248.0 | 251.4 |
| Mix (sec) | 4 | 3 | 5 | 4 | 5 | 3 | 5 | 5 | 5 |
| Cream Time (sec) | 5 | 4 | 6 | 5 | 6 | 4 | 6 | 6 | 6 |
| Gel Time (sec) | 14 | 15 | 15 | 15 | 15 | 15 | 12 | 14 | 14 |
| Tack Free Time (sec) | 24 | 79 | 25 | 35 | 30 | 54 | 24 | 31 | 27 |
| Density (lb/ft$^3$) | 1.62 | 1.63 | 1.61 | 1.63 | 1.57 | 1.57 | 1.70 | 1.65 | 1.77 |

TABLE 3

| Chemical | Example Number | | | | |
|---|---|---|---|---|---|
| | 18 | 19 | 20 | 21 | 22 |
| POLYOL 1 | 66.04 | — | 66.04 | — | — |
| POLYOL 5 | — | 66.04 | — | — | — |
| POLYOL 6 | — | — | — | 66.04 | — |
| POLYOL 7 | — | — | — | — | 66.04 |
| FR | 21.56 | 22.40 | 21.56 | 21.56 | 21.56 |
| SURF 2 | 1.75 | 1.75 | 1.75 | 1.75 | 1.75 |
| CAT 4 | 2.91 | 3.58 | 2.91 | 2.91 | 2.05 |
| CAT 5 | 0.62 | 0.75 | 0.62 | 0.62 | 0.44 |
| CAT 6 | 0.23 | 0.28 | 0.23 | 0.23 | 0.17 |
| WATER | 1.40 | 1.40 | 1.40 | 1.40 | 1.4 |
| PENTANE | 5.35 | 6.50 | 5.35 | 5.65 | 5.35 |
| ISOPENTANE | 5.35 | 6.50 | 5.35 | 5.65 | 5.35 |
| ISO | 191.75 | 199.13 | 191.75 | 191.68 | 187.62 |
| Properties | | | | | |
| Total Resin | 105.21 | 109.20 | 105.21 | 105.81 | 104.11 |
| Total Isocyanate | 191.75 | 199.13 | 191.75 | 191.68 | 187.62 |
| Index | 301.60 | 365.5 | 301.6 | 300.0 | 303.3 |
| Mix (sec) | 8 | 5 | 7 | 8 | 7 |
| Cream Time (sec) | 16 | 6 | 18 | 10 | 8 |
| Gel Time (sec) | 42 | 42 | 30 | 30 | 29 |
| Tack Free Time (sec) | 92 | 128 | 65 | 90 | 107 |
| Density (lb/ft$^3$) | 1.96 | 1.97 | 2.19 | 2.29 | 2.15 |

As is apparent, POLYOLS 5, 6, and 7 had viscosities and hydroxyl numbers similar to POLYOL 1 and allowed for production of foams having a similar gel time to those using POLYOL 1 while using similar catalyst compositions. Thus, POLYOLS 5, 6, and 7 are candidates for use as a simple "drop-in" replacement for POLYOL 1 in the production of PUR-PIR rigid foams by a continuous lamination process.

What is claimed is:

1. A polyether polyol comprising:
   (a) an alkoxylate of 4,4'-isopropylidenediphenol;
   (b) an alkoxylate of 2,4'-isopropylidenediphenol, 2,2'-isopropylidenediphenol, or a mixture thereof, and
   (c) an alkoxylate of components comprising structural elements which are derived from phenol, acetone, isopropylidenediphenol, or a mixture of any two or more thereof, but which are not isomers of isopropylidenediphenol, wherein the polyether polyol comprises an internal block comprising polymerized ethylene oxide moieties present in an amount of at least 50% by weight based on the total weight of polymerized alkylene oxide moieties of the internal block of the polyether polyol and an external cap comprising polymerized propylene oxide moieties present in an amount of at least 50% by weight, based on the total weight of the polymerized alkylene oxide moieties of the external cap of the polyether polyol, and wherein polymerized propylene oxide moieties of the external cap are present in an amount of at least 20% by weight, based on the total weight of polymerized alkylene oxide moieties in the polyether polyol.

2. The polyether polyol of claim 1, wherein the polyether polyol has an arithmetically calculated functionality of 1.5 to 3.

3. The polyether polyol of claim 1, wherein the polyether polyol has a viscosity at 25° C. of 1000 to 4900 mPas.

4. The polyether polyol of claim 1, wherein the polyether polyol has a measured hydroxyl number of 120 to 300 mg KOH/g.

5. The polyether polyol of claim 1, wherein:
(a) the alkoxylate of 4,4'-isopropylidenediphenol is present in an amount of at least 10% by weight, based on the total weight of the polyether polyol;
(b) the alkoxylate of 2,4'-isopropylidenediphenol, 2,2'-isopropylidenediphenol, or a mixture thereof, is present in an amount of at least 5% by weight, based on the total weight of the polyether polyol; and
(c) the alkoxylate of components comprising structural elements which are derived from phenol, acetone, isopropylidenediphenol, or a mixture of any two or more thereof, but which are not isomers of isopropylidenediphenol, is present in an amount of at least 10% by weight, based on the total weight of the polyether polyol.

6. The polyether polyol of claim 1, wherein polymerized ethylene oxide moieties are present in an amount of at least 90% by weight, based on the total weight of polymerized alkylene oxide moieties of the internal block of the polyether polyol.

7. The polyether polyol of claim 1, wherein polymerized propylene oxide moieties are present in an amount of at least 90% by weight, based on the total weight of the polymerized alkylene oxide moieties of the external cap of the polyether polyol.

8. The polyether polyol of claim 1, wherein polymerized ethylene oxide moieties are present in an amount of at least 60% by weight, based on the total weight of alkylene oxide moieties in the polyether polyol and polymerized propylene oxide moieties are present in an amount of up to 40% by weight, based on the total weight of alkylene oxide moieties in the polyether polyol.

9. The polyether polyol of claim 1, wherein polymerized propylene oxide moieties of the external cap are present in an amount of 30 to 40% by weight, based on the total weight of polymerized alkylene oxide moieties in the polyether polyol.

10. A method of forming a PUR-PIR rigid foam comprising reacting a polyisocyanate with the polyether polyol of claim 1, wherein the polyisocyanate is present in an amount sufficient to provide an isocyanate index of 180 to 450, and wherein the reaction occurs in the presence of components comprising c) a blowing agent and d) a catalyst.

11. A process for preparing the polyether polyol of claim 1, comprising:
(a) polymerizing an active hydrogen-containing initiator composition and a first portion of alkylene oxide, in the presence of a catalyst, to form an intermediate polymer having at least one hydroxyl end-group; and
(b) reacting the intermediate polymer and a second portion of alkylene oxide to form the polyether polyol,
wherein the active hydrogen-containing initiator composition comprises:
(i) 4,4'-isopropylidenediphenol,
(ii) 2,4'-isopropylidenediphenol, 2,2'-isopropylidenediphenol, or a mixture thereof, and
(iii) a component comprising structural elements which are derived from phenol, acetone, isopropylidenediphenol, or a mixture thereof, but which are not isomers of isopropylidenediphenol,
wherein the first portion of alkylene oxide comprises ethylene oxide in an amount of at least 50% by weight based on the total weight of the first portion of alkylene oxide and the second portion of alkylene oxide comprises propylene oxide in an amount of at least 50% by weight based on the total weight of the second portion of alkylene oxide, and
wherein propylene oxide is present in the second portion of alkylene oxide in an amount of at least 20% by weight, based on the total weight of alkylene oxide used in the process.

12. The process of claim 11, wherein the polyether polyol has a arithmetically calculated functionality of 1.5 to 3, a viscosity at 25° C. of 1000 to 4900 mPas, and a measured hydroxyl number of 120 to 300 mg KOH/g.

13. The process of claim 11, wherein the active hydrogen-containing initiator composition comprises:
(i) at least 10% by weight of 4,4'-isopropylidenediphenol, based on the total weight of the active hydrogen-containing initiator composition;
(ii) at least 5% by weight of 2,4'-isopropylidenediphenol, 2,2'-isopropylidenediphenol, or a mixture thereof, based on the total weight of the active hydrogen-containing initiator composition; and
(iii) at least 10% by weight of a compound with a chromane and/or indane base body, based on the total weight of the active hydrogen-containing initiator composition.

14. The process of claim 11, wherein ethylene oxide is present in the first portion of alkylene oxide in an amount of at least 90% by weight, based on the total weight of the first portion of alkylene oxide and propylene oxide is present in the second portion of alkylene oxide in an amount of at least 90% by weight, based on the total weight of the second portion of alkylene oxide.

15. The process of claim 11, wherein ethylene oxide is present in an amount of at least 60% by weight, based on the total weight of alkylene oxide used in the process and
propylene oxide is present in an amount of up to 40% by weight, based on the total weight of alkylene oxide that is used in the process.

16. The process of claim 11, wherein propylene oxide is present in the second portion of alkylene oxide in an amount of 30 to 40% by weight, based on the total weight of alkylene oxide used in the process.

17. The polyether polyol of claim 1, wherein polymerized ethylene oxide moieties are present in an amount of at least 95% by weight based on the total weight of polymerized alkylene oxide moieties of the internal block of the polyether polyol and polymerized propylene oxide moieties present in an amount of least 95% by weight, based on the total weight of the polymerized alkylene oxide moieties of the external cap of the polyether polyol.

18. The polyether polyol of claim 1, wherein polymerized ethylene oxide moieties are present in an amount of 100% by weight based on the total weight of polymerized alkylene oxide moieties of the internal block of the polyether polyol and polymerized propylene oxide moieties present in an amount 100% by weight, based on the total weight of the polymerized alkylene oxide moieties of the external cap of the polyether polyol.

* * * * *